United States Patent [19]

Jacobs et al.

[11] Patent Number: 5,510,056
[45] Date of Patent: Apr. 23, 1996

[54] PROCESS FOR THE CATALYTIC PARTIAL OXIDATION OF HYDROCARBONS

[75] Inventors: Ludovicus L. G. Jacobs; Peter W. Lednor; Alex G. G. Limahelu; Ronald J. Schoonebeek; Koert A. Vonkeman, all of Amsterdam, Netherlands

[73] Assignee: Shell Oil Company, Houston, Tex.

[21] Appl. No.: 346,110

[22] Filed: Nov. 29, 1994

[30] Foreign Application Priority Data

Nov. 29, 1993 [EP] European Pat. Off. .............. 93203331

[51] Int. Cl.$^6$ ........................................................ C01B 3/28
[52] U.S. Cl. ............................................................ 252/373
[58] Field of Search ...................................... 252/373, 372

[56] References Cited

U.S. PATENT DOCUMENTS

| | | | |
|---|---|---|---|
| 5,149,464 | 9/1992 | Green et al. | 252/373 |
| 5,152,976 | 10/1992 | Fong | 252/373 |
| 5,186,859 | 2/1993 | Sie | 252/373 |

FOREIGN PATENT DOCUMENTS 576096  12/1993  European Pat. Off. .

*Primary Examiner*—Werren B. Lone

[57] ABSTRACT

A process for the catalytic partial oxidation of a hydrocarbon feedstock comprises contacting a feed comprising a hydrocarbon feedstock and an oxygen-containing gas with a catalyst in a reaction zone, which catalyst is retained in the reaction zone in a fixed arrangement having a tortuosity of at least 1.1 and having at least 750 pores per square centimeter.

19 Claims, No Drawings

PROCESS FOR THE CATALYTIC PARTIAL OXIDATION OF HYDROCARBONS

FIELD OF THE INVENTION

The present invention relates to a process for the catalytic partial oxidation of hydrocarbons, in particular to a process for the preparation of a mixture of carbon monoxide and hydrogen from methane, natural gas, associated gas or other sources of light hydrocarbons.

BACKGROUND OF THE INVENTION

The partial oxidation of hydrocarbons, for example methane or natural gas, in the presence of a catalyst is an attractive route for the preparation of mixtures of carbon monoxide and hydrogen, known in the art as synthesis gas. The partial oxidation of a hydrocarbon is a highly exothermic reaction and, in the case in which methane is the hydrocarbon, proceeds by the following reaction:

$$2CH_4 + O_2 \rightarrow 2CO + 4H_2$$

A number of process regimes have been proposed in the art for carrying out the catalytic partial oxidation reactions. One regime that is most suitable for application on a commercial scale is to contact the feed gases with the catalysts retained in a fixed arrangement, for example as a fixed bed of particles or a monolith structure. The literature contains a number of documents disclosing details of experiments conducted into the catalytic partial oxidation of hydrocarbons, in particular methane, employing a wide range of catalysts in a fixed bed arrangement.

European Patent Application publication No. 0 303 438 (EP-A-0 303 438) discloses a process for the catalytic partial oxidation of a hydrocarbonaceous feedstock in which a gaseous mixture of the hydrocarbonaceous feedstock, oxygen or an oxygen-containing gas and, optionally, steam, is introduced into a catalytic partial oxidation zone to contact a catalyst retained therein. The catalyst employed in the process may comprise a wide range of catalytically active components, for example palladium, platinum, rhodium, iridium, osmium, ruthenium, nickel, chromium, cobalt, cerium, lanthanum and mixtures thereof. Further, it is stated in EP-A-0 303 438 that materials not normally considered to be catalytically active may also be employed as catalysts, for example refractory oxides such as cordierite, mullite, mullite aluminium titanate, zirconia spinels and alumina. The catalyst may be of a variety of forms, for example sheets of corrugated metal packed to form elongate channels therethrough or wire mesh. However, preference is given in EP-A-0 303 438 to the use of catalysts in the form of extruded honeycomb monoliths. These monoliths comprise a large number of parallel channels extending through the structure in the direction of flow of the feed and product gasses.

European Patent No. 0 262 947 (EP-B-0 262 947) discloses a process for generating hydrogen by the partial oxidation of a hydrocarbon in which a mixture of the hydrocarbon and oxygen is injected into a mass of a catalyst. The catalyst disclosed in EP-B-0 262 947 comprises platinum and chromium oxide supported on a refractory solid. The support structures described in EP-B-0 262 947 are honeycomb monolith supports, of the type used in purifying the exhausts from motor vehicles or from chemical plants, and particulate supports, preferably comprising particles having a maximum dimension of from 1 to 4 mm, for example 1.5 mm.

D. A. Hickman and L. D. Schmidt ("Synthesis Gas Formation by Direct Oxidation of Methane over Pt Monoliths", Journal of Catalysis 138, 267–282, 1992)) have conducted experiments into the partial oxidation of methane in the presence of catalysts comprising either platinum or rhodium. The partial oxidation reactions were conducted at substantially atmospheric pressure and at temperatures in the range of from 600 to 1500 K (337° to 1237° C.). The catalysts employed were in the form of metal gauzes, metal-coated foam monoliths and metal coated extruded monoliths. The metal gauze catalysts comprised 1 to 10 layers of gauzes of either 40 mesh (40 wires per inch) or 80 mesh. The foam monoliths were of alpha-alumina and described as having an open cellular, sponge-like structure. The samples employed had a nominal porosity of 30 to 50 pores per inch (ppi). The extruded monoliths were cordierite extruded monoliths, having 400 square cells/in$^2$ and consisted of straight parallel channels giving laminar flows of gases through the channels under the conditions of gas flow rate studied.

J. K. Hockmuth ("Catalytic Partial Oxidation of Methane over a monolith Supported Catalyst", Applied Catalysis B: Environmental, 1 (1992) 89–100) reports the catalytic partial oxidation of methane using a catalyst comprising a combination of platinum and palladium supported on a cordierite monolith body.

A number of academic experiments have been reported in the literature in which catalysts have been employed in the form of fixed beds of catalyst particles.

Thus, A. T Ashcroft et al. ("Selective oxidation of methane to synthesis gas using transition metal catalysts", Nature, vol. 344, No. 6264, pages 319 to 321, 22nd March, 1990) disclose the partial oxidation of methane to synthesis gas in the presence of a range of ruthenium-containing catalysts. The objective of the experiments was to establish that the partial oxidation process could be carried out under mild conditions and at low temperatures. To this end, the experiments were conducted with a low gas hourly space velocity of 40,000/hr, a pressure of 1 atmosphere and a temperature of about 775° C. The catalyst employed comprised small amounts of a solid, powdered catalyst.

P. D. F. Vernon et al. ("Partial Oxidation of methane to Synthesis Gas", Catalysis Letters 6 (1990) 181–186) disclose a range of experiments in which catalysts comprising nickel, ruthenium, rhodium, palladium, iridium or platinum, either supported on alumina or present in mixed oxide precursors, were applied. Again, the experiments reported are limited to a catalytic partial oxidation process employing only mild operating conditions and using small amounts of catalyst in the form of pellets retained in a fixed bed. The authors report the same experiments in "Partial Oxidation of Methane to Synthesis Gas, and Carbon Dioxide as an Oxidizing Agent for Methane Conversion", Catalysis Today, 13 (1992) 417–426.

R. H. Jones et al. ("Catalytic Conversion of Methane to Synthesis Gas over Europium Iridate, Eu$_2$Ir$_2$O$_7$,", Catalysis Letters 8 (1991) 169–174) report the selective partial oxidation of methane using the europium iridium pyrochlore Eu$_2$Ir$_2$O$_7$. The reaction was studied under the mild conditions of a pressure of 1 atmosphere and a temperature of 873 K (600° C.). The catalyst was prepared by grinding and subsequent pressing to form pellets. The pelletized catalyst was packed into a porous silica frit and used directly in the experiments.

U.S. Pat. No. 5,149,464 is directed to a method for selectively oxygenating methane to carbon monoxide and hydrogen by bringing the reactant gas mixture at a temperature of about 650° C. to 900° C. into contact with a solid catalyst which is generally described as being either:

a) a catalyst of the formula $M_xM'_yO_z$, where:

M is at least one element selected from Mg, B, Al, Ln, Ga, Si, Ti, Zr and Hf; Ln is at least one member of lanthanum and the lanthanide series of elements;

M' is a d-block transition metal, and each of the ratios x/y and y/z and (x+y)/z is independently from 0.1 to 8; or b) an oxide of a d-block transition metal; or c) a d-block transition metal on a refractory support; or d) a catalyst formed by heating a) or b) under the conditions of the reaction or under non-oxidizing conditions. The d-block transition metals are said in U.S. Pat. No. 5,149,464 to be selected from those having atomic number 21 to 29, 40 to 47 and 72 to 79, the metals scandium, titanium, vanadium, chromium, manganese, iron, cobalt, nickel, copper, zirconium, niobium, molybdenum, technetium, ruthenium, rhodium, palladium, silver, hafnium, tantalum, tungsten, rhenium, osmium, iridium, platinum and gold. It is stated in U.S. Pat. No. 5,149,464 that the preferred metals are those in Group VIII of the Periodic Table of the Elements, that is iron, osmium, cobalt, rhenium, iridium, palladium platinum, nickel and ruthenium.

The process described in U.S. Pat. No. 5,149,464 is operated at a temperature in the range of from 650° C. to 900° C., with a range of from 700° C. to 800° C. being preferred. A range of experiments are described in U.S. Pat. No. 5,149,464 in which a variety of catalysts comprising Group VIII metals were tested, including ruthenium oxide, presidium/ruthenium oxides, pyrochlores, ruthenium on alumina, rhodium on alumina, palladium on alumina, platinum on alumina, nickel/aluminium oxide, perovskites and nickel oxide.

A similar general disclosure of a catalyst for use in the catalytic partial oxidation process is made in International Patent Application publication No. WO 92/11199. WO 92/11199 specifically discloses experiments in which catalysts comprising iridium, palladium, ruthenium, rhodium, nickel and platinum supported on alumina were applied. All the experiments were conducted under mild process conditions, with typical conditions being a pressure of 1 atmosphere, a temperature of 1050 K (777° C.) and a gas hourly space velocity of about 20,000/hr.

The experiments described in both U.S. Pat. No. 5,149, 464 and WO 92/11199 employed catalysts in the form of solid powdered particles retained in a fixed bed arrangement by packing in a reaction tube between two plugs of silica wool.

For successful operation on a commercial scale, the catalytic partial oxidation process must be able to achieve a high conversion of the hydrocarbon feedstock at a high gas hourly space velocities. Further, the selectivity of the process to the desired products of carbon monoxide and hydrogen must be high. Both these factors must be met using process equipment which is both economical to construct and economical to operate. In this respect, there exists a significant problem in operating the catalytic partial oxidation process with a fixed bed of catalyst, in that the pressure drop encountered when using the fixed bed prevents the process operating under the high gas space velocities demanded of a commercial operation.

Surprisingly, it has now been found that catalytic partial oxidation can be significantly improved if the process is operated with the catalyst retained in a fixed bed arrangement meeting a very specific set of criteria. In particular, it has been found that the selectivity of the process is significantly improved if the fixed bed arrangement combines a high tortuosity with a high number of pores. Specifically, it has been found that the selectivity is significantly improved if the fixed arrangement has a tortuosity of greater than 1.1 and at least 750 pores per square centimeter. Further, it has been found that using a fixed arrangement meeting these two criteria allows the amount of catalytically active metal present in the catalyst to be reduced whilst still maintaining a high level of activity and selectivity.

SUMMARY OF THE INVENTION

The present invention provides a process for the catalytic partial oxidation of a hydrocarbon feedstock, which process comprises contacting a feed comprising a hydrocarbon feedstock and an oxygen-containing gas with a catalyst in a reaction zone, which catalyst is retained in the reaction zone in a fixed arrangement having a tortuosity of at least 1.1 and having at least 750 pores per square centimeter.

DESCRIPTION OF THE PREFERRED EMBODIMENTS

The process of the present invention may be used to prepare a mixture of carbon monoxide and hydrogen from any gaseous hydrocarbon or hydrocarbon feedstock having a low boiling point. The hydrocarbon feedstock is in the gaseous phase when contacting the catalyst. The process is particularly suitable for the partial oxidation of methane, natural gas, associated gas or other sources of light hydrocarbons. In this respect, the term "light hydrocarbons" is a reference to hydrocarbons having from 1 to 5 carbon atoms. The process may advantageously be applied in the conversion of gas from naturally occurring reserves of methane which contain a substantial amount of carbon dioxide. The feed preferably comprises methane in an amount of at least 50% by volume, more preferably at least 75% by volume, especially at least 80% by volume.

The hydrocarbon feedstock is contacted with the catalyst as a mixture with an oxygen-containing gas. Air is suitable for use as the oxygen-containing gas. However, the use of substantially pure oxygen as the oxygen-containing gas may be preferred. In this way, the need for handling a large volume of inert gas, for example nitrogen when using air as the oxygen-containing gas, is avoided. The feed may optionally comprise steam.

The methane-containing feed and the oxygen-containing gas are mixed in such amounts as to give an oxygen-to-carbon ratio in the range of from about 0.3 to about 0.8, more preferably, in the range of from about 0.45 to about 0.75. References to the oxygen-to-carbon ratio refer to the ratio of oxygen in the form of molecules ($O_2$) to carbon atoms present in the methane-containing feed. Preferably the oxygen-to-carbon ratio is in the range of from about 0.45 to about 0.7, with oxygen-to-carbon ratios in the region of the stoichiometric ratio of about 0.5, that is in a range of from about 0.45 to about 0.65, being especially preferred. If steam is present in the feed, the steam-to-carbon ratio is preferably in the range of from above 0.0 to about 3.0, more preferably from 0.0 to about 2.0. The methane-containing feed, oxygen-containing gas and steam, if present, are preferably well mixed prior to being contacted with the catalyst.

The process of the present invention may be operated at any suitable pressure. For commercial operations, elevated pressures, that is pressures significantly above atmospheric pressure, may be preferred. The process may be operated at pressures in the range of up to about 150 bars. Preferably, the process is operated at pressures in the range of from about 2 to about 125 bars, especially from about 2 to about 100 bars.

The process may be operated at any suitable temperature. Under conditions of high pressure prevailing in the process, the feed is preferably contacted with the catalyst at high temperatures in order to obtain the desired degree of conversion. Accordingly, the hydrocarbon feedstock and the oxygen-containing gas are preferably contacted with the catalyst at a temperature greater than 950° C., more preferably a temperature in the range of from about 950° C. to about 1300° C., especially from about 1000° C. to about 1200° C. The hydrocarbon feedstock and the oxygen-containing gas are preferably preheated prior to being contacted with the catalyst.

The hydrocarbon feedstock and the oxygen-containing gas may be provided during the process at any suitable space velocity. It is an advantage of the process of this invention that very high gas space velocities can be achieved. Thus, typical space velocities for the process (expressed as normal liters of gas per kilogram of catalyst per hour) are in the range of from about 20,000 to about 100,000,000 Nl/kg/hr, more preferably in the range of from about 50,000 to about 50,000,000 Nl/kg/hr. Space velocities in the range of from about 500,000 to about 30,000,000 Nl/kg/hr are particularly suitable.

Catalyst compositions suitable for use in the catalytic partial oxidation of hydrocarbons are known in the art. Preferred catalysts for use in the process of the present invention comprise, as the catalytically active component, a metal selected from Group VIII of the Periodic Table of the Elements. References in this specification to the Periodic Table of the Elements are to the CAS version, as published in the CRC Handbook of Chemistry and Physics, 68th Edition. Preferred catalysts for use in the process comprise a metal selected from ruthenium, rhodium, palladium, osmium, iridium and platinum. Catalysts comprising ruthenium, rhodium or iridium as the catalytically active metal are most suitable for use in the process.

The catalytically active metal is most suitable supported on a carrier. Suitable carrier materials are well known in the art and include the refractory oxides, such as silica, alumina, titania, zirconia and mixtures thereof. Mixed refractory oxides, that is refractory oxides comprising at least two cations, may also be employed as carrier materials for the catalyst.

The catalytically active metal may be deposited on the refractory oxide carrier by techniques well known in the art. A most suitable technique for depositing the metal on the carrier is impregnation, which technique typically comprises contacting the carrier material with a solution of a compound of the catalytically active metal, followed by drying and calcining the resulting material.

In use in the process of the present invention, the catalyst is retained in form of a fixed arrangement. The fixed arrangement may comprise a fixed bed of catalyst particles. Alternatively, the fixed arrangement may comprise the catalyst in the form of a monolith structure. The fixed arrangement may consist of a single monolith structure or, alternatively, may comprise a number of separate monolith structures combined to form the fixed arrangement. A most preferred monolith structure comprises a ceramic foam. Suitable ceramic foams for use in the process are available commercially.

As described hereinbefore, it is an essential feature of the process of the present invention that the catalyst is retained in a fixed arrangement having a high tortuosity. The term "tortuosity" is a common term in the art which, when referring to a fixed catalyst arrangement, can be defined as the ratio of the length of the path followed by a gas flowing through the arrangement to the length of the shortest straight line path through the arrangement. Thus, the honeycomb monolith structures described in the prior art comprising a number of straight, parallel channels extending through the structure in the direction of the flowing gas, have a tortuosity of 1.0. A typical value for the tortuosity of a fixed bed of catalyst particles is about 1.5. Ceramic foam structures may be prepared having a tortuosity of the order of 1.5 to 4.0, or even higher. In general, the tortuosity of the fixed arrangement of the catalyst for use in the process of the present invention should be in the range of from 1.1 to about 10.0, more preferably to about 5.0. A most suitable range of tortuosity is from 1.3 to 4.0.

Further, it is an essential feature of the process of this invention that the fixed arrangement of the catalyst comprises a large number of pores. In this respect, the term "pore" is a general reference to a space or interstice in the fixed arrangement between two adjacent portions of the catalyst. Thus, in the case of a fixed bed of catalyst particles, the term "pore" refers to the space between two adjacent particles. When referring to monolith structures, for example ceramic foams, the term "pore" refers to the openings or spaces between adjacent portions or lands of the ceramic structure. Thus, it will be appreciated that the pores referred to in respect of the present invention have a nominal diameter of the order of magnitude of 0.1 mm. These are to be contrasted with pores which may be present in the catalyst support material itself, as is the case, for example, when a ceramic foam or particles prepared from a porous refractory oxide are employed.

The fixed arrangement comprises at least 750 pores per square centimeter. Preferably, the fixed arrangement comprises from about 1000 to about 15000 pores per square centimeter, more preferably from about 1250 to about 10000 pores per square centimeter.

It will be clear that the fixed arrangement of the catalyst in the process of this invention is a porous structure. The fixed arrangement has a typical void fraction in the range of from 0.6 to 0.9.

The gaseous mixture of the hydrocarbon feedstock and the oxygen-containing gas are preferably contacted with the catalyst under adiabatic conditions. For the purposes of this specification, the term "adiabatic" is a reference to reaction conditions in which substantially all heat loss and radiation from the reaction zone is prevented, with the exception of heat leaving in the gaseous effluent stream of the reactor.

In a further aspect, the present invention relates to carbon monoxide or hydrogen whenever prepared by a process as hereinbefore described.

The mixture of carbon monoxide and hydrogen prepared by the process of this invention is particularly suitable for use in the synthesis of hydrocarbons, for example by means of the Fischer-Tropsch synthesis, or the synthesis of oxygenates, for example methanol. Processes for the conversion of the mixture of carbon monoxide and hydrogen into such products are well known in the art.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The process of the present invention is further described by way of the following illustrative examples, of which Examples 1 and 2 are examples of the process of the present invention and Examples 3 and 4 are for comparison purposes only.

EXAMPLES

Example 1

A commercially available zirconia ceramic foam ($ZrO_2$, 1550 pores per square centimeter) was impregnated with rhodium using conventional impregnation techniques to give a final rhodium loading of 5% by weight.

A reactor was constructed comprising a transparent sapphire tube mounted concentrically within an outer transparent polycarbonate tube. The rhodium-containing catalyst prepared as hereinbefore described was loaded into the sapphire tube and retained in the tube to form a fixed arrangement having a tortuosity of between 1.5 and 2.5 and 1550 pores per square centimeter.

Methane and oxygen were thoroughly mixed before being introduced into the reactor to contact the fixed bed of catalyst. Methane and oxygen were present in amounts sufficient to give an oxygen-to-carbon ratio of 0.62. The gaseous feed mixture was supplied to the reactor at a gas hourly space velocity (GHSV) of 500,000 Nl/kg/hr (Normal liters of gas per kilogram of catalyst per hour) and at a pressure of 3.3 bara.

The operating temperature of the catalyst bed was measured by optical pyrometry. The composition of the gas mixture leaving the reactor was measured by gas chromatography. The conversion and the selectivity of the process to carbon monoxide and hydrogen (on the basis of methane converted) was determined. The operating conditions of the reactor and the results of the experiment are summarized in Table I below.

Example 2

The general procedure described in Example 1 was followed to prepare and test a rhodium on zirconia ceramic foam catalyst having a rhodium loading of 0.5% by weight.

The operating conditions and results of the experiment are set out in Table I below.

Example 3

By way of comparison, the general procedure described in Example 1 was followed to prepare and test a rhodium on zirconia ceramic foam catalyst having a rhodium loading of 5% by weight. A commercially available zirconia ceramic foam was selected as starting material, which resulted in the fixed catalyst arrangement having a tortuosity of from 1.5 to 2.5 and about 390 pores per square centimeter.

The operating conditions and results of the experiment are set out in Table I below.

Example 4

By way of comparison, the general procedure described in Example 1 was followed to prepare and test a rhodium on zirconia ceramic foam catalyst having a rhodium loading of 1% by weight. A commercially available zirconia ceramic foam was selected as starting material, which resulted in the fixed catalyst arrangement having a tortuosity of from 1.5 to 2.5 and about 390 pores per square centimeter.

The operating conditions and results of the experiment are set out in Table I below.

As can be seen from Table I, the process of the present invention, as exemplified in Examples 1 and 2, offers significant advantages in terms of process performance and operating costs. In particular, it can be seen that the processes of Examples 1 and 2 gave a significantly higher level of methane conversion when compared with the comparative examples, Examples 3 and 4. Further, it is clear that the process of the present invention gives rise to a much improved hydrogen selectivity than the comparative processes. In addition, it can be seen that when the fixed arrangement of the present invention is employed, the amount of the catalytically active component employed in the catalyst, in this case rhodium, may be significantly reduced without adversely affecting the conversion and yields of the process. From the comparative examples, Examples 3 and 4, it can be seen that a reduction in the rhodium loading gives rise to a significant reduction in both the overall methane conversion and the selectivity of the process to hydrogen.

TABLE I

| | Example No. | | | |
| --- | --- | --- | --- | --- |
| | 1 | 2 | 3 | 4 |
| Fixed Catalyst Arrangement | | | | |
| Tortuosity | 1.5–2.5 | 1.5–2.5 | 1.5–2.5 | 1.5–2.5 |
| Pores per square cm | 1550 | 1550 | 390 | 390 |
| Rhodium (% wt) | 5 | 0.5 | 5 | 1 |
| Operating Conditions | | | | |
| Temperature (°C.) | 1155 | 1070 | 1108 | 1150 |
| Pressure (bars) | 3.3 | 3.3 | 3.3 | 3.3 |
| GHSV (1000 Nl/kg/hr) | 500 | 500 | 400 | 400 |
| oxygen/carbon ratio | 0.62 | 0.62 | 0.62 | 0.62 |
| $CH_4$ conversion (%) | 96.7 | 97.5 | 87.3 | 83.6 |
| CO selectivity (%)[1] | 90.9 | 91.8 | 92.2 | 92.2 |
| $H_2$ selectivity (%)[2] | 90.0 | 90.1 | 81.8 | 78.3 |

[1] selectivity to CO based on $CH_4$ conversion
[2] selectivity to $H_2$ based on $CH_4$ conversion

We claim:
1. A process for the catalytic partial oxidation of a feedstock selected from the group consisting of methane, natural gas, $C_1$–$C_5$ hydrocarbons and mixtures thereof to prepare a synthesis gas comprising a mixture of carbon monoxide and hydrogen, which process comprises contacting said feedstock and an oxygen-containing gas with a catalyst in a reaction zone, which catalyst is retained in the reaction zone in a fixed arrangement having a tortuosity of at least 1.1 and having at least 750 pores per square centimeter.

2. The process of claim 1 wherein the oxygen-containing gas is substantially pure oxygen.

3. The process of claim 1 wherein the feed comprises the hydrocarbon feedstock and the oxygen-containing gas in amounts giving an oxygen-to-carbon ratio of from 0.3 to 0.8.

4. The process of claim 3 wherein the feed is contacted with the catalyst at a pressure in the range of up to 150 bar.

5. The process of claim 4 wherein the feed is contacted with the catalyst at a temperature in the range of from 950° C. to 1300° C.

6. The process of claim 5 wherein the feed is contacted with the catalyst at a gas hourly space velocity in the range of from 20,000 to 100,000,000 Nl/l/hr.

7. The process of claim 6 wherein the catalyst comprises a metal selected from the group consisting of rhodium, iridium, ruthenium and mixtures thereof.

8. The process of claim 7 wherein the catalyst is retained in the fixed arrangement in the form of a fixed bed of catalyst particles or in the form of a ceramic foam.

9. The process of claim 8 wherein the fixed arrangement of the catalyst has a tortuosity in the range of from 1.1 to about 10.0.

10. The process of claim 9 wherein the fixed arrangement of the catalyst has from about 1000 to about 15000 pores per square centimeter.

11. The process of claim 10 wherein the fixed arrangement has a void fraction in the range of about 0.6 to about 0.9.

12. The process of claim 11 wherein the feed is contacted with the catalyst under substantially adiabatic conditions.

13. The process of claim 2 wherein the feed comprises the hydrocarbon feedstock and the oxygen-containing gas in amounts giving an oxygen-to-carbon ratio of from 0.45 to 0.75.

14. The process of claim 13 wherein the feed is contacted with the catalyst at a pressure in the range from 2 to 125 bar.

15. The process of claim 14 wherein the feed is contacted with the catalyst at a temperature in the range of from 1000° C. to 1200° C.

16. The process of claim 15 wherein the feed is contacted with the catalyst at a gas hourly space velocity in the range of from 50,000 to 50,000,000 Nl/l/hr.

17. The process of claim 16 wherein the fixed arrangement of the catalyst has a tortuosity in the range of from 1.1 to about 5.0.

18. The process of claim 17 wherein the fixed arrangement of the catalyst has from about 1250 to about 10000 pores per square centimeter.

19. A process for the catalytic partial oxidation of a feedstock selected from the group consisting of methane, natural gas, $C_1$–$C_5$ hydrocarbons and mixtures thereof, which process comprises contacting said feedstock and an oxygen-containing gas to prepare a synthesis gas comprising a mixture of carbon dioxide and hydrogen, wherein the feedstock and the oxygen-containing gas are present in amounts to provide an oxygen-to-carbon ratio of from 0.45 to 0.65, with a catalyst comprising a metal selected from the group consisting of rhodium, iridium, ruthenium and mixtures thereof in a reaction zone at a pressure from about 2 to about 100 bar at a temperature in the range from about 1000° C. to about 1200° C. at a gas hourly space velocity in the range of from about 500,000 Nl/l/hr to about 30,000,000 Nl/l/hr, which catalyst is retained in the reaction zone in a fixed arrangement having a tortuosity in the range of from about 1.3 to about 4.0 and having from about 1200 to about 10000 pores per square centimeter.

\* \* \* \* \*